(12) United States Patent
Ovshinsky et al.

(10) Patent No.: US 6,833,118 B2
(45) Date of Patent: Dec. 21, 2004

(54) HYDROGEN STORAGE BED SYSTEM INCLUDING AN INTEGRATED THERMAL MANAGEMENT SYSTEM

(75) Inventors: Stanford R. Ovshinsky, Bloomfield Hills, MI (US); Rosa T. Young, Bloomfield Hills, MI (US); Yang Li, Troy, MI (US); Vitaliy Myasnikov, Birmingham, MI (US); Valeriy Sobolev, Southfield, MI (US)

(73) Assignee: Texaco Ovonic Hydrogen Systems LLC, Rochester Hills, MI (US)

( * ) Notice: Subject to any disclaimer, the term of this patent is extended or adjusted under 35 U.S.C. 154(b) by 915 days.

(21) Appl. No.: 09/742,827

(22) Filed: Dec. 20, 2000

(65) Prior Publication Data

US 2002/0073617 A1 Jun. 20, 2002

(51) Int. Cl.[7] .......................... B01D 50/00; B01D 53/34
(52) U.S. Cl. ....................... 422/180; 422/177
(58) Field of Search ................................ 422/180, 177; 420/402

(56) References Cited

U.S. PATENT DOCUMENTS

| | | | | |
|---|---|---|---|---|
| 3,516,263 A | * | 6/1970 | Reilly Jr. et al. | 62/46.2 |
| 4,195,989 A | * | 4/1980 | Gamo et al. | 148/424 |
| 5,616,432 A | * | 4/1997 | Ovshinsky et al. | 429/59 |
| 6,193,929 B1 | * | 2/2001 | Ovshinsky et al. | 420/402 |
| 6,305,442 B1 | * | 10/2001 | Ovshinsky et al. | 141/231 |

* cited by examiner

Primary Examiner—M. Alexandra Elve
(74) Attorney, Agent, or Firm—David W. Schumaker; Frederick W. Mau, II; Marvin S. Siskind

(57) ABSTRACT

A hydrogen storage bed system which includes a pressure container, a hydrogen storage alloy disposed within the pressure container, and an integrated thermal management system integrally disposed within the pressure container. The integrated thermal management system includes heat generation means, cooling means, and heat distribution means.

36 Claims, 9 Drawing Sheets

HYDROGEN STORAGE BED SYSTEM INCLUDING AN INTEGRATED THERMAL MANAGEMENT SYSTEM

FIELD OF THE INVENTION

The instant invention solves the vexatious thermal management problems that have, to date, plagued hydrogen storage bed systems. The revolutionary design includes an integrated thermal management system which evenly and efficiently heats and cools hydrogen storage alloys that are able, for the first time to realistically use the most ubiquitous, ultimate source of fuel for the next millennium and beyond, hydrogen. More particularly, there is described the integration of heat generators, such as catalytic combustors, cooling devices, such as heat exchangers, and a heat distribution system, such as thermal bus bars or heat pipes in combination with heat distribution fins.

BACKGROUND OF THE INVENTION

Hydrogen, as a fuel, has enormous energy capacity and, when oxidized or burned, produces only water as a product of that combustion. The facts of its ease of burning, its effectively pollution-free burning, combined with the relative ease of modification of existing power sources, including the internal combustion engine makes hydrogen an ideal source of energy for energy-hungry economies. Stanford Ovshinsky and his research teams with Energy Conversion Devices have long recognized the potential value of hydrogen as the ultimate fuel. In light of that recognition, development efforts have continued in support of means for storage (U.S. Ser. No. 09/435,497 filed Nov. 6, 1999) and transportation of hydrogen including an infrastructure in support of a hydrogen economy (U.S. Ser. No. 09/444,810 filed Nov. 22, 1999).

While hydrogen is the ultimate fuel, its storage and transportation presents difficulties. In the liquid state, hydrogen is subject to severe losses due to vaporization; additionally there is an initial high energy cost in compression and refrigeration to attain its liquid state. In the gaseous state, to approach economic storage capacities, hydrogen must be compressed, containment of such compressed gas requires heavy-walled containers which themselves must be heavy and of sturdy build. The Ovshinsky teams have addressed these needs, as noted above, through development of hydrogen storage alloys; metals and metallic alloys having high storage capacity for hydrogen as well as high rates of hydrogen charging and discharging at comparatively low temperatures.

The development of such high-capacity solid storage material in which the hydrogen is stored within the molecular or crystalline structure of the material has been key to solution of a related yet still different concern within a hydrogen-energy based economy. That is the dependable, repeatable storage and release of hydrogen in small quantities for portable uses, especially for portable motive power needs. For such applications, it is necessary to be able to reliably and efficiently fully charge the storage material and discharge the same which is on-board to run the motive power source which may be a hydrogen combustion engine, hydrogen fuel-cell running an electric motor, or other hydrogen-consuming motive system. Coupled with these needs is a need to assure that such a system and its container is able to withstand the constant vibration associated with motive transportation. As previously described by the Ovshinsky teams, metal hydride materials have recently become a focus of general interest as a means of solid-state hydrogen storage generally and for reliable on-demand or as-needed storage and dispensing of hydrogen for motive power in transportation applications.

Energy production for motive power is a large and growing fraction of the contribution of troublesome "greenhouse gases" being constantly added in huge volumes to the Earth's atmosphere. Of these, carbon dioxide, being produced in greater volumes, is particularly onerous of these simply because it is produced in extremely large volumes as a product of combustion of carbon-based fuels, as well as carbon monoxide, another of the greenhouse gases carrying additional burdens of toxicity during respiration. Use of hydrogen as a fuel simply eliminates the production of the oxides of carbon and produces only water as a product of its combustion. Replacement of gasoline, liquefied petroleum gases (LPG's), alcohols, fuel oils, or other carbon-based fuels with hydrogen, particularly in motive fuel applications, will provide tremendous reduction in the production and release of such global-warming and toxic materials.

As noted in the previously mentioned '810 application, careful thermal management of the hydrogen storage material is critical to the reliable cycling of hydriding and dehydriding, or charging and discharging of metal hydrides or other storage materials. The inventors now provide here means for controlling the release of heat during charging or refueling as well as generating and controlling the application of heat during discharge or use of the fuel from the on-board storage container or bed of hydrogen storage material. These inventors have developed and now disclose means for selectively or evenly heating or cooling the storage bed as needed for both use in transit for power generation and refueling of the "gas tank" at the "filling station". This is accomplished by design of heating and cooling means, or combinations thereof with in the bed of storage material coupled with means for conveying heat or cooling capacity to distant areas in such a storage bed. Also of consideration, and part of the below-described invention is thermal insulation of the inside of the storage container from the atmosphere to assure that the thermal management is conducted as intended for smooth operation of whatever motive vehicle is being operated from such a fuel-storage bed.

Additionally, the storage containers of this invention may be sized in generally infinite volumes and dimensions, they may also be combined into systems by addition of multiple usefully-sized containers. Effectively, the inventors here have developed and now provide hydrogen fuel carrying and storage capacity for motive vehicles of any use, shape, or size including, but not limited to cars, trucks, trains, aircraft and watercraft. Application of hydrogen fuel to move these vehicles will be a large step toward serious and useful reduction of the currently, and sometimes catastrophically, occurring global warming.

SUMMARY OF THE INVENTION

The instant invention comprises a hydrogen storage bed system which includes a pressure container, a hydrogen storage alloy disposed within the pressure container, and an integrated thermal management system integrally disposed within the pressure container. The integrated thermal management system includes heat generation means, cooling means, and heat distribution means.

The heat generation means one or more of electrical heating elements and catalytic combustors, with the latter preferred. The catalytic combustors are designed to combust one or more of hydrogen, gasoline, fuel oil, propane, diesel fuel, or natural gas, with propane and hydrogen preferred. The cooling means comprises a tube-type heat exchanger designed to utilize air, hydrogen, water or organic coolants. Air, hydrogen and water are the preferred coolants. The heat generation means and the cooling means can be combined into a single unit designed heat and cool.

The heat distribution means can include heat sinks thermally coupled to both said heat generation means and said cooling means and heat distribution fins thermally coupled to said heat sinks and dispersed within the hydrogen storage alloy. The heat distribution fins and heat sinks are formed from a material selected from the group consisting of thermally conductive graphite, stainless steel, magnesium and magnesium alloys. Alternatively, the heat distribution means can include heat pipes thermally coupled to both said heat generation means and said cooling means instead of heat sinks. The heat distribution fins thermally coupled to the heat pipes and dispersed within the hydrogen storage alloy. Once again, the heat distribution fins are formed from a material selected from the group consisting of thermally conductive graphite, stainless steel, magnesium and magnesium alloys.

The hydrogen storage alloy is selected from the group consisting of T-Zr based alloys and Mg based alloys. The preferred high capacity Mg-based storage alloys contain greater than about 90 weight % magnesium, and contain at least one modifier element. The at least one modifier element creates a magnesium based alloy which is capable of storing at least 7 weight % hydrogen and is capable of absorbing 80% of the full storage capacity of hydrogen in under 1.5 minutes at 300° C. The modifier elements mainly include Ni and Mm (misch metal) and can also include additional elements such as Al, Y and Si. Thus the alloys will typically contain 0.5–2.5 weight % nickel and about 1.0–4.0 weight % Mm (predominantly contains Ce and La and Pr). The alloy may also contain one or more of 3–7 weight % Al, 0.1–1.5 weight % Y and 0.3–1.5 weight % silicon. The hydrogen storage alloy is in the form of powder, pellets or a mixture thereof, with the latter preferred.

The pressure container is formed from one or more materials selected from the group consisting of stainless steel or fiber reinforced polymers. The preferred pressure container is a multilayer structure, such as a three layered structure which includes 1) an inner layer formed form a lightweight material which is non-reactive with hydrogen and said storage alloy, and can withstand the operating temperature of the system, 2) a middle layer formed from a lightweight insulating material; and 3) an outer layer formed from a fiber reinforced polymer composite material which contains the operating pressure of the bed system.

The hydrogen storage bed system may also include thermocouples disposed throughout the interior of the hydrogen storage alloy to determine the state of charge of the system by observing temperature spikes in discharged areas of the alloy.

Finally, the system may include a hydrogen gas distribution system to enhance the speed of hydriding/dehydriding of the storage alloy. The distribution system typically includes a distribution manifold and one or more hydrogen permeable gas distribution tubes.

BRIEF DESCRIPTION OF THE FIGURES

FIG. 8b is a schematic depiction of a transverse-cross-sectional view of the fifth embodiment of a hydrogen storage bed system of FIG. 5a;

FIG. 9b is a schematic depiction of a transverse-cross-sectional view of the sixth embodiment of a hydrogen storage bed system of FIG. 6a.

DETAILED DESCRIPTION OF THE INVENTION

The instant invention includes solid-state, metal-hydride, hydrogen storage bed systems with integrated heat generation and heat exchange. The instant storage system includes storage alloys that adsorb and desorb hydrogen for storage and subsequent use in applications such as, for example, to power an automobile. The instant storage bed systems include one or more integral heat generation devices to provide the required heat to release the stored hydrogen from the hydrogen storage alloy. The heat generation device is also integrated with the cooling system which removes the heat of hydride formation when the storage alloy is being charged with hydrogen. The system also includes heat distribution means to transfer heat between locations within the system which are remote from the heating/cooling devices. The heat distribution means are provided to evenly supply/remove heat from the system, thus maintaining a uniform temperature throughout the entire system. Details of the instant invention will be discussed herein below with respect to specific embodiments.

Figure 1:
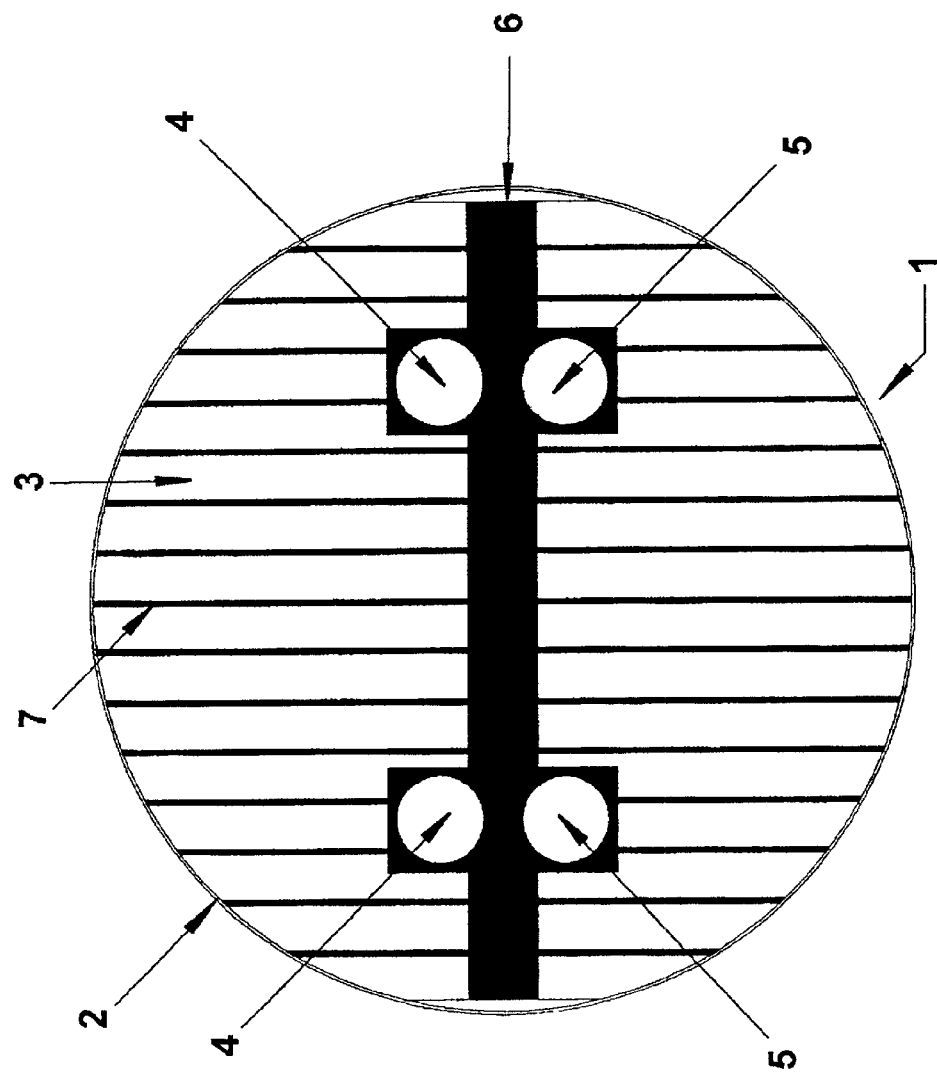
FIG. 1 is a schematic depiction of a transverse-cross-sectional view of one embodiment of a hydrogen storage bed system of the instant invention.

FIG. 1 is a schematic depiction of a transverse-cross-sectional view of one embodiment of a hydrogen storage bed system 1 of the instant invention. The system 1, includes a pressure container 2 within which is contained a hydrogen storage alloy 3. The integrated thermal management system includes heat generation means 4 and cooling means 5. As used herein, the terms "heating means" and "heat generation means" are used interchangeably and are meant to designate in-situ heat generation means. The heating and cooling means are in intimate thermal contact with a heat distribution system which includes a heat sink 6 with distributed heat distribution fins 7. During charging of hydrogen into the hydrogen storage alloy 3, heat generated by hydride formation in the storage alloy 3 is transferred to the distribution fins 7, which is then transferred to the heat sink 6, and ultimately to the cooling means 5. During discharge of hydrogen from storage alloy 3, heat is generated in the heat means 4, transferred to the heat sink 6, further transferred to the distribution fins 7 and finally to the storage alloy 3, where it is used to release the hydrogen.

Figure 2:
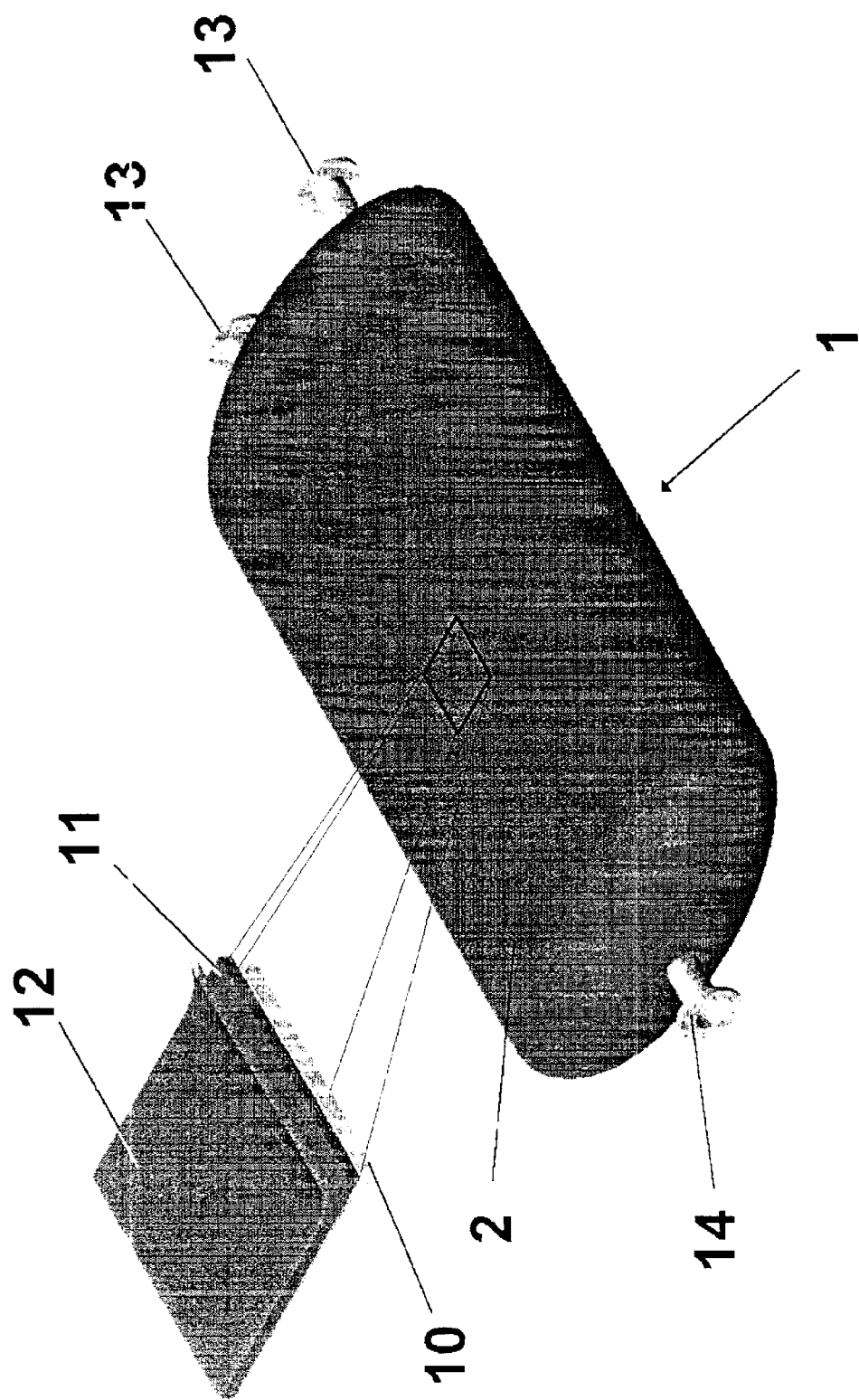
FIG. 2 depicts an external view of a storage bed system 1 according to the instant invention having a multilayered pressure container.

The pressure container 2 can be formed from any material or materials that contains the equilibrium pressure of hydrogen at the operating temperatures of the storage bed system 1. The materials must also be non-reactive with the stored hydrogen and the hydrogen storage alloy 3 and must withstand the typical operating temperature of the system. The materials must also not allow for hydrogen diffusion therethrough and not be subject to hydrogen embrittlement over the lifetime of the cotainer. The temperatures and pressures will of course depend on the particular storage alloy 3 that is used. Typically for a magnesium based alloy, the pressures can range up to 20 bar, and temperatures will range up to 450° C. Typical construction materials for the pressure container 2 can include metals such as stainless steels. The pressure container 2 can also be made thermally insulative by constructing the container out of insulative materials or by insulating the exterior or interior of a thermally conductive material such as a metal. Whether or not the pressure container 2 is insulated will depend on whether or not external heating and cooling through the pressure container are employed. If there is external heating and cooling, then insulating the pressure container 2 would defeat the purpose thereof. The pressure container 2 can also be made of fiber reinforced polymeric materials such as carbon fiber reinforced epoxy materials, etc., alone or in conjunction with other materials (i.e. a multilayer pressure container). The advantage of such fiber reinforced polymer and multilayer construction materials is savings in weight. FIG. 2 depicts an external view of a storage bed system 1 according to the instant invention having a multilayered pressure container 2, hydrogen input/output port 14 and heating/cooling ports 13. The inset of FIG. 2 shows the multilayer structure of the pressure container 2. The inner layer 10 is formed form a lightweight material which is non-reactive with hydrogen and the storage alloy 3, and can withstand the operating temperature of the system. The middle layer 11 is a lightweight insulating material designed specifically to minimize heat loss from the bed system to the environment. Finally, the outer layer is a fiber reinforced polymer composite that contains the operating pressure of the bed system.

Any alloy which safely and efficiently stores and releases hydrogen may be used as the hydrogen storage alloy 3 in the storage system 1 of the instant invention. Specifically useful are alloys such as Ti—Zr based $AB_2$, room temperature hydrogen storage alloys and high capacity Mg-based storage alloys. Most useful are the high capacity, high kinetics storage alloys fully described in copending U.S. patent application Ser. No. 09/435,497, entitled "High Storage Capacity Alloys Enabling a Hydrogen-based Ecosystem", filed on Nov. 6, 1999 for Ovshinsky et al. ("the '497 application").

In general the high capacity Mg-based storage alloys contain greater than about 90 weight % magnesium, and contain at least one modifier element. The at least one modifier element creates a magnesium based alloy which is capable of storing at least 7 weight % hydrogen and is capable of absorbing 80% of the full storage capacity of hydrogen in under 1.5 minutes at 300° C. The modifier elements mainly include Ni and Mm (misch metal) and can also include additional elements such as Al, Y and Si. Thus the alloys will typically contain 0.5–2.5 weight % nickel and about 1.0–4.0 weight % Mm (predominantly contains Ce and La and Pr). The alloy may also contain one or more of 3–7 weight % Al, 0.1–1.5 weight % Y and 0.3–1.5 weight % silicon.

The storage alloy 3 can be used in the storage system 1 in the form of a powder or can be pelletized as described in U.S. application Ser. No. 09/634,678, entitled "Safe, Economical Transport of Hydrogen in Pelletized Form", filed Aug. 8, 2000 for Ovshinsky et al. While the use of powdered materials may in some cases facilitate loading of the powder into the system. However, powder can be difficult to handle and hazardous to use, thus in some instances loading the system 1 with pelletized storage alloy will be advantageous. Additionally, it is often difficult to get a high enough packing density of storage alloy 3 in the storage bed system 1 when using only powder. Thus, it may be useful to load the storage alloy 3 into the storage bed system 1 in the form of a mixture of powder and pellets.

During discharge of the hydrogen stored in these aforementioned hydrogen storage alloys 3, heat is required to release the hydrogen from the alloys. Generally, there are a number of ways in which this heat can be provided. For example, when hydrogen is to be supplied to an internal combustion engine, the heat can come from the exhaust of the engine itself. However, the instant invention is designed to be used when little or no external heat is available, such as when the hydrogen is to be supplied to a fuel cell. Thus, another source of heat is needed.

The heat generation means 4 provides the heat needed to release the stored hydrogen. The heat generation means 4 can be any means to generate, in-situ, the heat needed to discharge hydrogen from the storage alloy 3. Specifically, the heat generation means may include electrical heating elements, catalytic combustors. Catalytic combustors and the catalytic combustion process is well known in the art and are the preferred means for heat generation. Catalytic combustors essentially work by chemically combining a fuel (such as hydrogen or a hydrocarbon) and an oxidizer (such as oxygen or air) in the presence of a catalyst upon which the fuel and the oxidizer are reacted to form combustion products, and heat. This heat is then transferred, directly or indirectly, the surroundings (the hydrogen storage alloy in the case of the instant invention).

The catalytic combustor provides an internal heat source for heating the hydrogen storage alloy 3 of the instant invention. A typical catalytic combustor comprises a nonporous chamber which does not permit the flow of either oxygen, hydrogen or combustion products between the interior of the combustor and the metal-hydride material or other heat transfer means. Preferably, the chamber is formed from a nonporous, thermally conductive material. Housed within the chamber is a catalyst. Generally, the catalyst is one which can lower the activation energy of combustion reaction. Fuel passes into and though the combustor along with compressed air or oxygen. The catalyst catalyzes the reaction between the fuel and the oxygen (or oxygen in air). The heat generated from catalytic combustion is used to heat the hydrogen storage alloy in the storage system up to a temperature at which the hydride material desorbs hydrogen.

At this point, the heat produced by the combustor does two things: (1) it maintains the temperature of the metal-hydride storage material (i.e., compensates for heat transfer out of the material), and (2) provides the heat of desorption of hydrogen from the hydrogen storage alloy.

While hydrogen itself can be burned or catalytically combusted to provide the necessary heat to release the stored hydrogen, this reduces the useable hydrogen available to power other devices, such as a fuel cell, thus increasing the weight and volume of the storage bed required to supply a fixed mass of hydrogen. For instance, in a typical fuel cell vehicle, some of the stored hydrogen may be needed to provide the heat necessary to release all of the stored hydrogen and heat up the surrounding components (i.e. casings, heat transfer components, etc.). Obviously it is necessary to minimize this loss of available hydrogen. Thus a secondary fuel may be used. The secondary fuel may be any fuel which is readily available, inexpensive and easily stored. Examples of such a fuel are gasoline, fuel oil, propane, diesel fuel, natural gas, etc. The preferred fuel is propane, and the preferred method of storing the propane is in liquid form. Specifically, it is noted that merely two gallons of propane would be needed to release all the stored hydrogen required to travel 300 miles with a typical hydrogen powered fuel cell vehicle. This makes the vehicle a very low emission vehicle.

The cooling means 5, remove the heat produced during charging of the hydrogen storage alloy 3. That is, during charging of hydrogen to the storage alloy 3, heat is released (i.e. heat of hydriding). To maintain the proper operating temperature during charging, this heat must be removed. The cooling means 5 are typically heat exchanger devices such as a coolant flowing through a tube or other enclosed space. The coolant may be any conventional coolant such as air or water. The coolant may also be hydrogen, which, as described in U.S. application Ser. No. 09/558,827, entitled "A Hydrogen Cooled Hydrogen Storage Unit Having Maximized Cooling Efficiency", filed Apr. 26, 2000 for Ovshinsky et al., makes an excellent cooling medium. The coolant may also be any of the organic materials used in the art as a coolant. The materials for forming the exchanger will, or course, depend upon the specific coolant used. The materials must be non-reactive with the coolant, hydrogen, and the storage alloy 3 and must be able to withstand the typical operating temperatures of the system 1. Specific materials will be thermally conductive and may include metals such as stainless steel or other thermally conductive materials.

Figure 6:
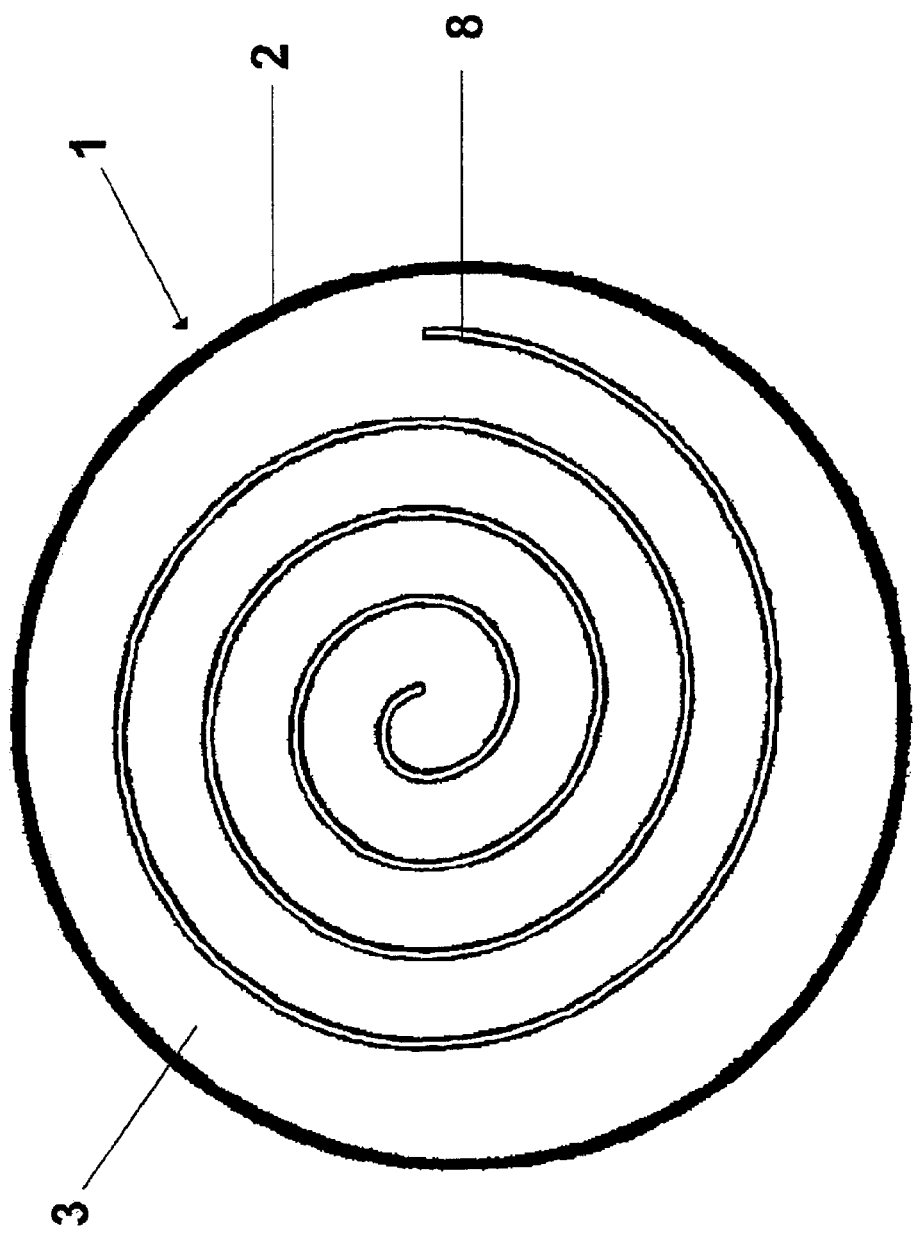
FIG. 6 is a schematic depiction of a transverse-cross-sectional view of a third embodiment of a hydrogen storage bed system of the instant invention including a combined heating/cooling means.

In an alternative embodiment, the heat generation means 4 and the cooling means 5 may be combined into one means (see for example FIG. 6). By combining these two means into one, the overall weight and volume of the storage bed system 1 is significantly reduced. This combination can most advantageously occur when air or hydrogen is used as the coolant medium. This is because during heating of the system (required for discharging), both a fuel and air are inserted into the catalytic combustors and react to heat the storage bed system 1. Alternatively, during cooling (required when charging), air or hydrogen is individually inserted into the catalytic combustor and the inserted gas acts as a coolant, removing the heat of hydride formation. If this alternative is used, it may be necessary to reduce the coverage of catalyst on the interior of the heating means to enhance heat transfer to the coolant medium.

The heat sink 6 is thermally connected to the heat generation means 4 and the cooling means 5. The heat sink 6 evenly distributes heat from the heating means 4 to the heat distribution fins 7 during discharge of hydrogen, and accepts heat from the heat distribution fins 7 transferring it to the cooling means 5 during charging of hydrogen. The combination of heat sink 6 and heat distribution fins 7 ensures proper heat transfer throughout the entire storage bet system 1, and also insures that the entire storage bed system 1 is at as uniform a temperature as possible. The heat sink 6 and the heat distribution fins 7 are preferably, but not necessarily, formed from the same material. The material should be as light weight as possible but needs to be thermally conductive. The material must also not be reactive with the stored hydrogen or the hydrogen storage alloy and able to withstand the typical operating temperatures of the system 1.

The heat sink 6 and the heat distribution fins 7 can preferably be formed from a metal such as stainless steel, with the preferred metal being magnesium or a structural magnesium alloy. Magnesium and alloys thereof are thermally conductive, light weight, thermally and structurally sound and generally non-reactive with the stored hydrogen and the storage alloy 3. The heat sink 6 and the heat distribution fins may also me made from thermally conductive graphite. The heat sink 6 is large enough to act as a heat reservoir or thermal mass for heat as it is transferred into or out of the system 1. The large reservoir insures that the heat within the system 1 is fairly uniformly distributed throughout the bulk of the system (i.e. the hydrogen storage materials and the heat distribution fins 7). The heat sink 6 is shaped such that all of the heat distribution fins 7 can be evenly disposed throughout the entire mass of the hydrogen storage alloy 3.

EXAMPLE

A bed system 1 was produced according to the embodiment of FIG. 1. The system 1 consists of a cylindrical pressure container 2, formed from stainless steel, within which is contained a magnesium based hydrogen storage alloy 3. The Mg alloy, designated FC-76, had a composition: 95.6 wt. % Mg, 1.6 wt. % Ni, 0.8 wt. % Si and 2.0 wt % Mm. The integrated thermal management system includes electrical heat generation means 4 and tube-type heat exchange cooling means 5 through which both air and water coolants were passed. The heating and cooling means are in intimate thermal contact with the heat sink 6 which is formed from pure magnesium and is shaped generally as a rectangular slab which is positioned within the cylindrical pressure container 2 such that the length of the slab traverses the length of the cylinder and the width of the slab traverses a diameter of the cylinder. Heat distribution fins 7 are thermally attached to the heat sink 6. The heat distribution fins 7 project out from the heat sink 6 and are fairly evenly distributed throughout the mass of hydrogen storage alloy 3. The heat distribution fins 7 are formed from formed from pure magnesium and are shaped as rectangular plates. The rectangular plates or foil heat distribution fins 7 are disposed within the cylindrical pressure container 2 such that the length thereof traverses the length of the cylinder. One edge of the rectangular plate heat distribution fins 7 is in thermal contact with the heat sink 6 and the opposing edge is adjacent to the pressure container 2.

Figure 3:
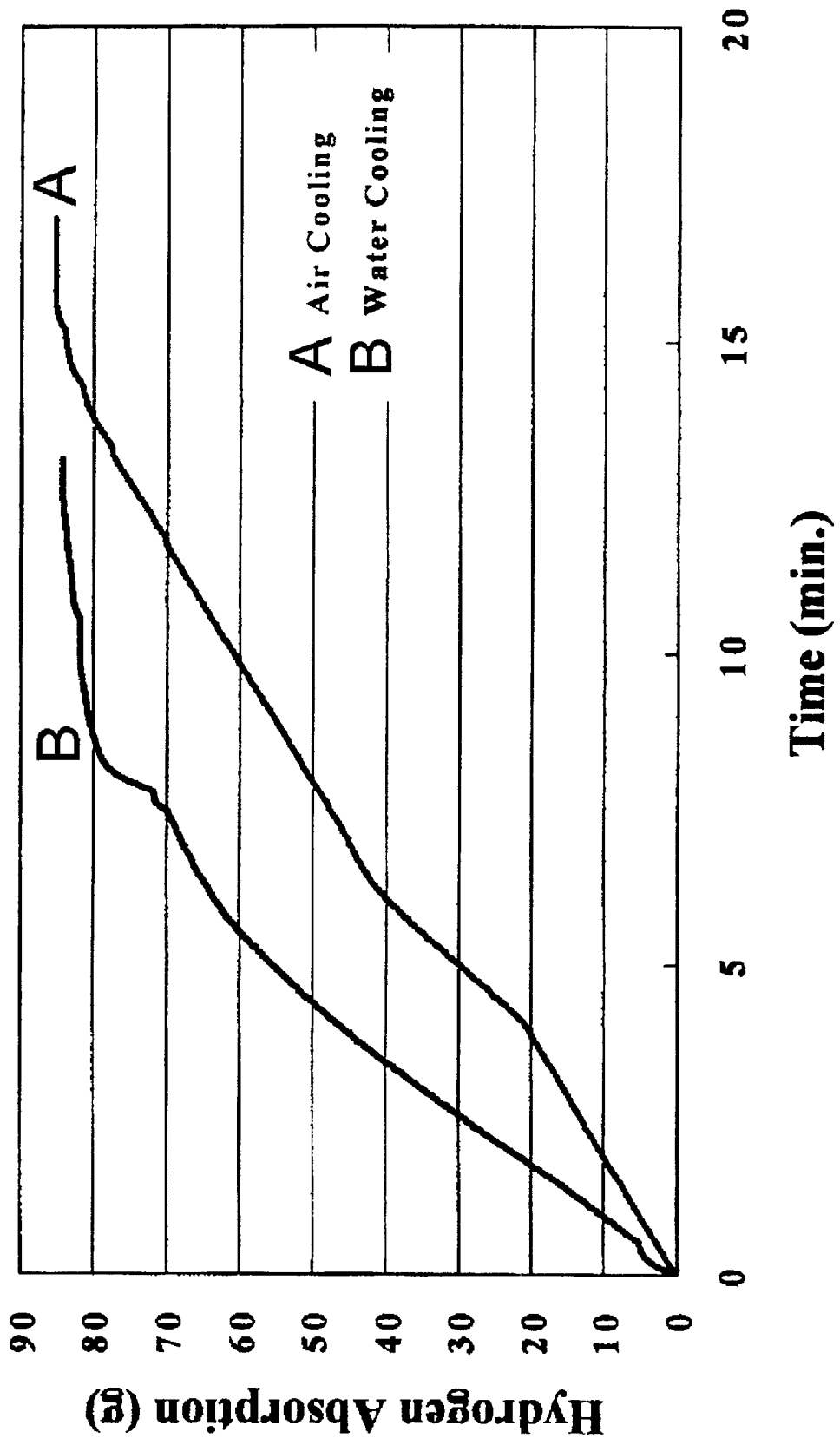
FIG. 3 is a plot of grams of stored hydrogen versus time in minutes for both air and water cooling of a storage bed system 1 according to the instant.

One and a third kilograms of the FC-76 magnesium based hydrogen storage alloy powder 3 was packed into the bed system 1 at a packing density of about 0.6 g/cc (this could be enhance by packing both powder and pellets). The system was charged and had a storage capacity of about 85 grams of hydrogen. As shown in FIG. 3, which is a plot of grams of stored hydrogen versus time in minutes, both air and water cooling were effective to allow for proper charging.

Curve A shows the stored hydrogen versus time for air cooling and curve B is for water cooling. As can be seen, both coolants are effective, but the water cooling clearly allows for faster charging, essentially completing a charging cycle in less than 10 minutes.

Figure 4:
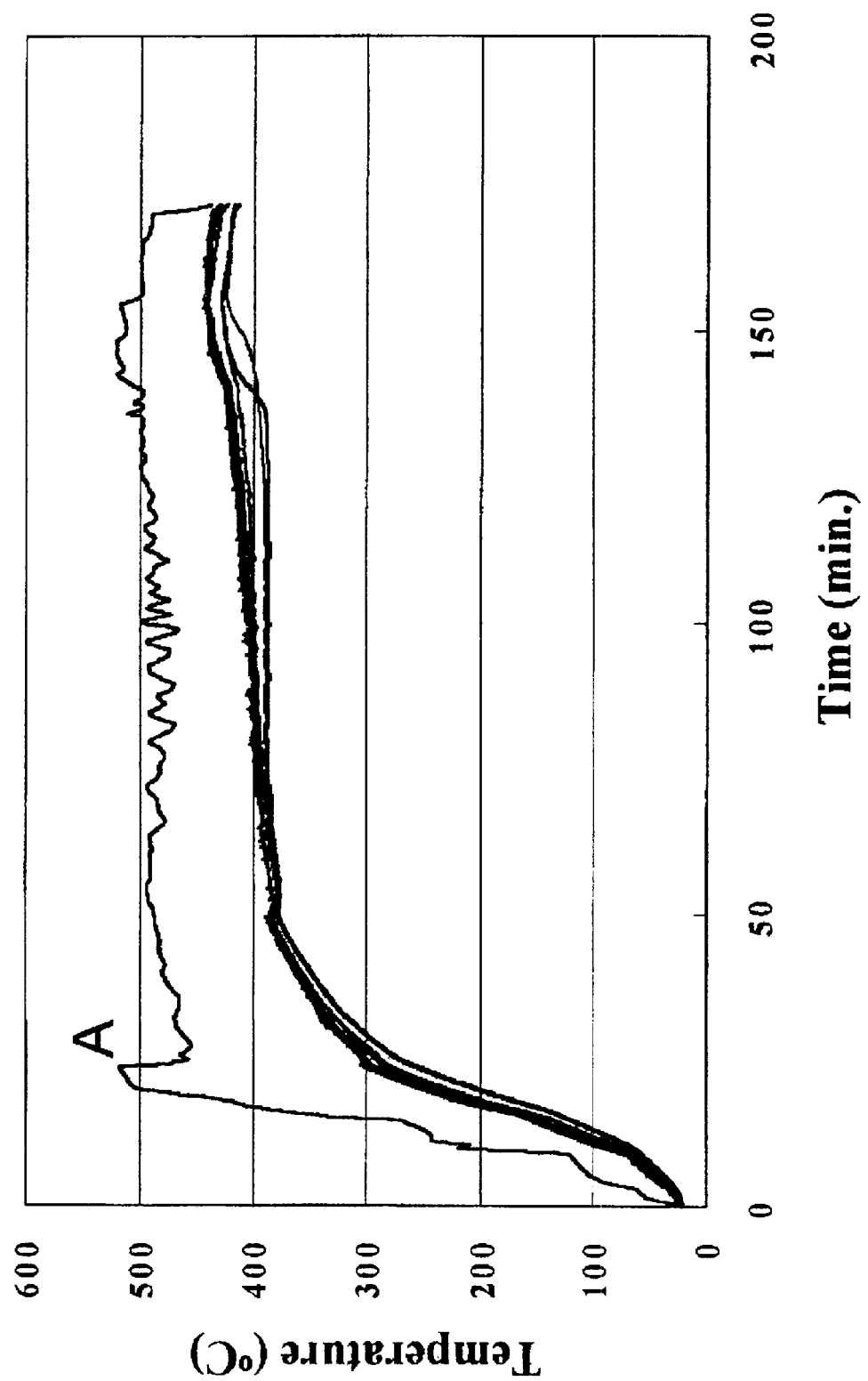
FIG. 4 is plot of temperature versus time during discharge of hydrogen from a storage bed system 1 according to the instant, the temperatures, which were taken by thermocouples distributed throughout the storage bed, indicates that the heat management system is effective.

FIG. 4 is plot of temperature versus time during discharge of hydrogen from the storage bed. The temperatures were taken by thermocouples distributed throughout the storage bed. Curve A plots the temperature (also measured by thermocouple) of the electric heater used to heat the alloy and thus discharge the stored hydrogen. As can clearly be seen, the temperature of the storage bed system is fairly uniform throughout, thus demonstrating that the instant thermal management system is effective. The temperature increase near the end of the curves indicated a rise in the temperature of the system as the charge of hydrogen is depleted.

Figure 5:
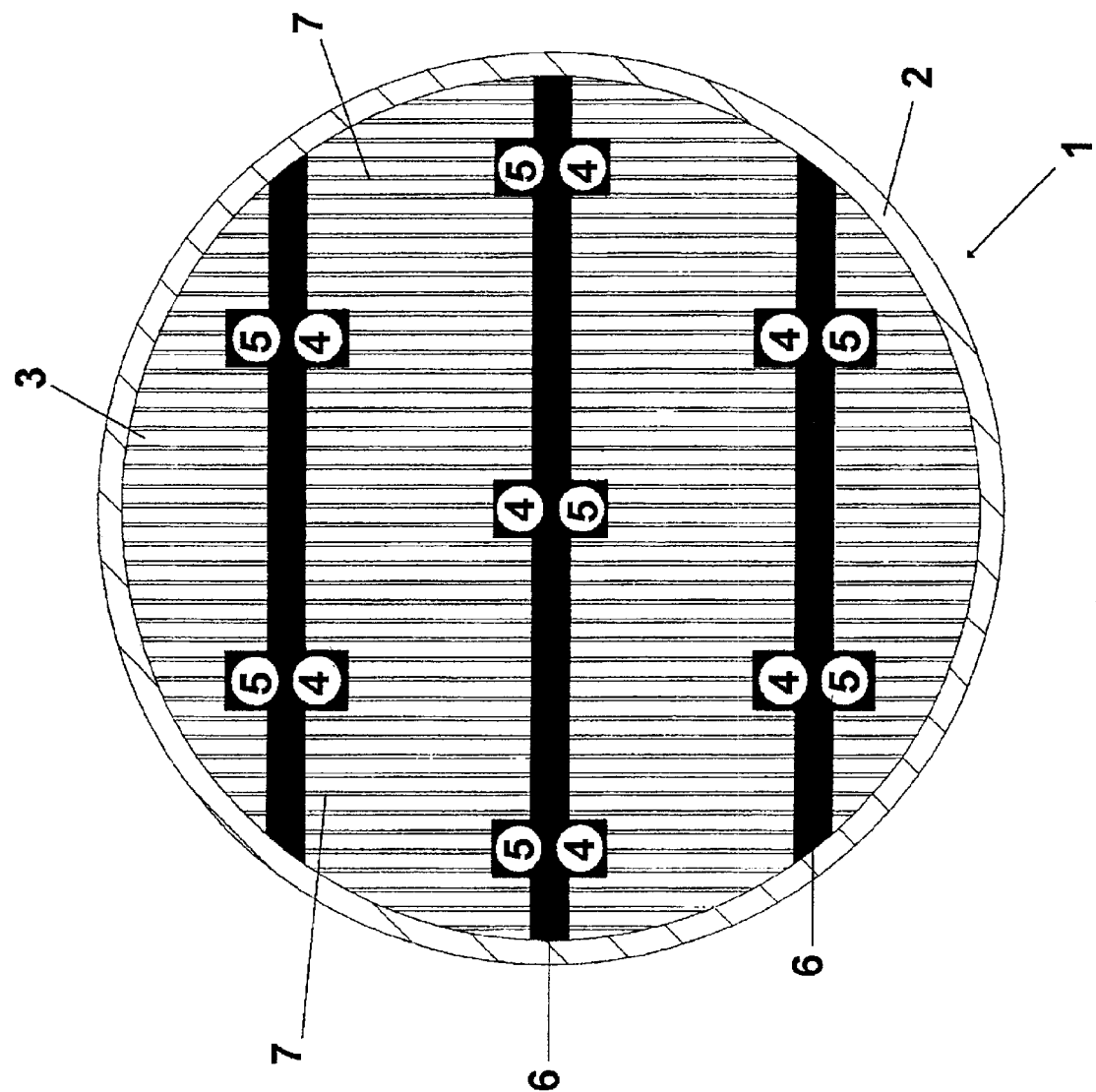
FIG. 5 is a schematic depiction of a transverse-cross-sectional view of a second embodiment of a hydrogen storage bed system of the instant invention, similar to, but larger than, the system of FIG. 1.

FIG. 5 is a schematic depiction of a transverse-cross-sectional view of a second embodiment of a hydrogen storage bed system 1 of the instant invention. Similar to the system of FIG. 1, the system 1 of this embodiment includes a pressure container 2 within which is contained a hydrogen storage alloy 3. The integrated thermal management of this system includes seven heating means 4 and seven cooling means 5 (which can be integrated into dual purpose heating and cooling means). The heating and cooling means are in intimate thermal contact with a heat distribution system which includes a three heat sinks 6 with evenly distributed heat distribution fins 7. In this system, the three heat sinks 6 are fairly evenly spaced throughout the pressure container 2 and some of the heat distribution fins 7 are disposed such that opposing edges are in thermal contact with two heat sinks 6.

FIG. 6 is a schematic depiction of a transverse-cross-sectional view of a third embodiment of a hydrogen storage bed system 1 of the instant invention. The system 1, includes a cylindrical pressure container 2 within which is contained a hydrogen storage alloy 3. The integrated thermal management system includes a combined heating/cooling means 8, which is a hollow coiled spiral disposed within the cylindrical pressure container 2, wherein the central axis of the hollow coiled spiral is coincidental with the central axis of the cylindrical pressure container 2. The interior of the hollow coiled spiral is coated with a catalytic material to form a catalytic combustor. Thus, the interior of the hollow coiled spiral acts as a heater when fuel and an oxidizer are passed therethrough, and as a cooler when a coolant gas (such as air or hydrogen) is passed therethough.

It should be noted that since the hollow coiled spiral is in intimate thermal contact with and highly distributed throughout the hydrogen storage alloy 3, additional heat distributions components, such as heat sinks and thermal distribution fins, are not necessary. However, if it is found that heat is not evenly distributed within the system 1, these heat distributions components may be added as necessary.

Figure 7:
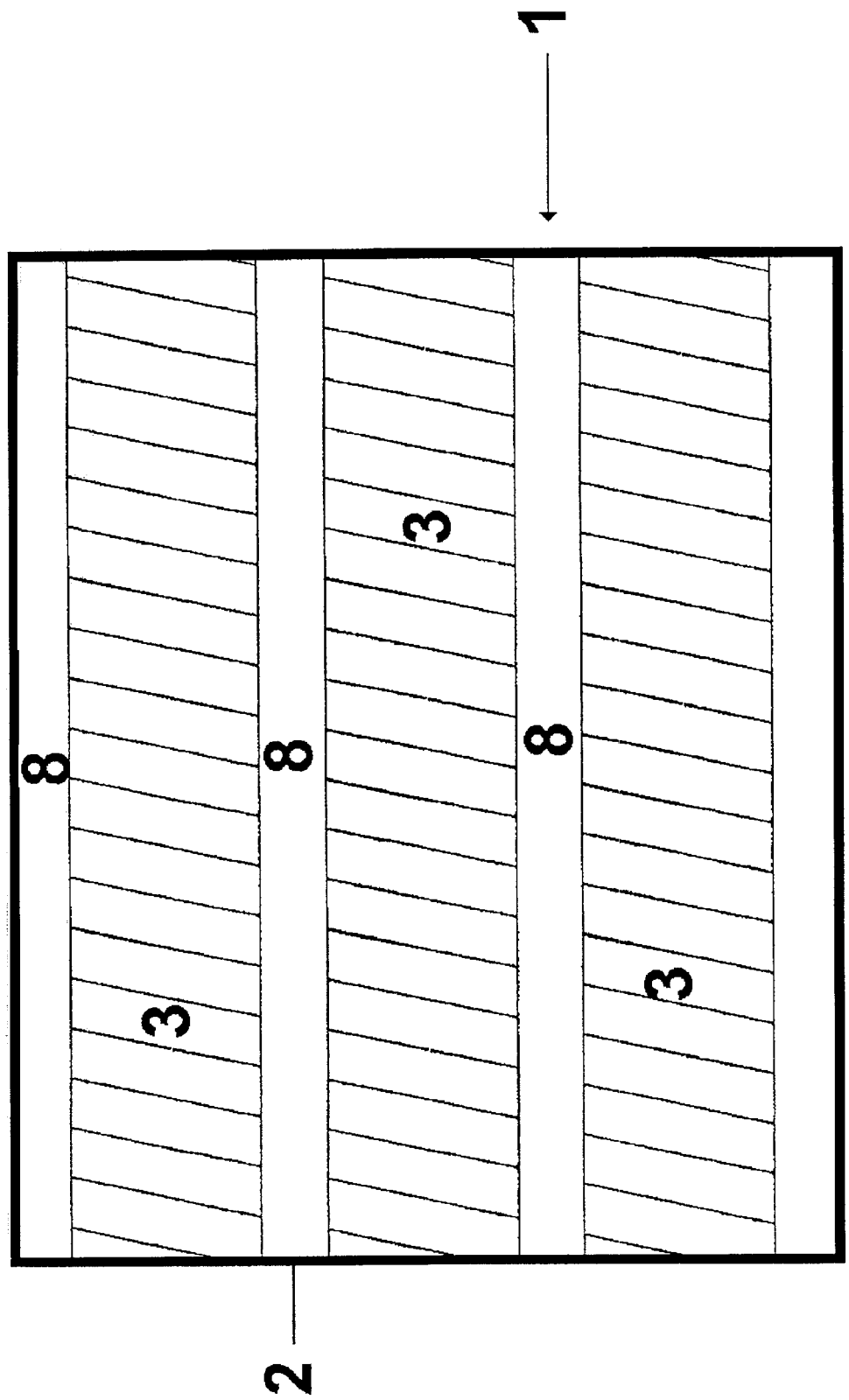
FIG. 7 is a schematic depiction of a transverse-cross-sectional view of a fourth embodiment of a hydrogen storage bed system of the instant invention including planar combined heating/cooling means layered between layers of hydrogen storage alloy.

FIG. 7 is a schematic depiction of a cross-sectional view of a fourth embodiment of a hydrogen storage bed system 1 of the instant invention. The system 1, includes a pressure container 2 within which is contained a hydrogen storage alloy 3. The pressure container has a rectangular or square cross-section and may have an elongated axis or be more cubelike. The hydrogen storage alloy 3 is disposed in the pressure container in layers between which is disposed the integrated thermal management system includes combined heating/cooling means 8. The combined heating/cooling means 8 are hollow plates disposed between the layers of hydrogen storage alloy 3. The interior of the hollow plate is coated with a catalytic material to form a catalytic combustor. Thus, the interior of the hollow plate acts as a heater when fuel and an oxidizer are passed therethrough, and as a cooler when a coolant gas (such as air or hydrogen) is passed therethough. It should be noted that since the hollow plates are in intimate thermal contact with and are highly distributed throughout the hydrogen storage alloy 3, additional heat distributions components, such as heat sinks and thermal distribution fins, are not necessary. However, if it is found that heat is not evenly distributed within the system 1, these heat distributions components may be added as necessary.

Figure 8B:
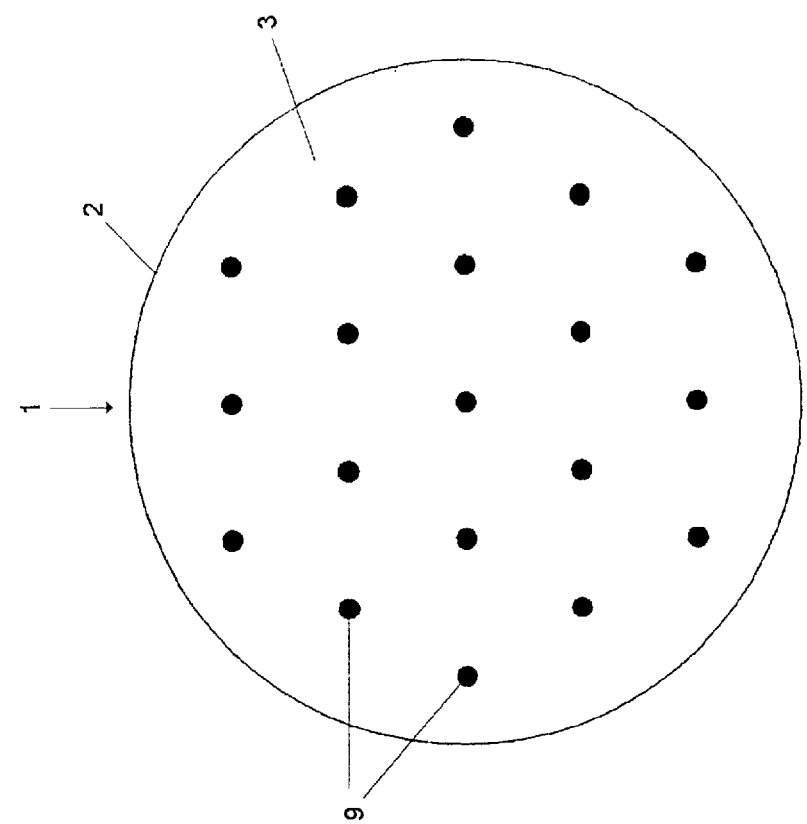
Figure 8A:
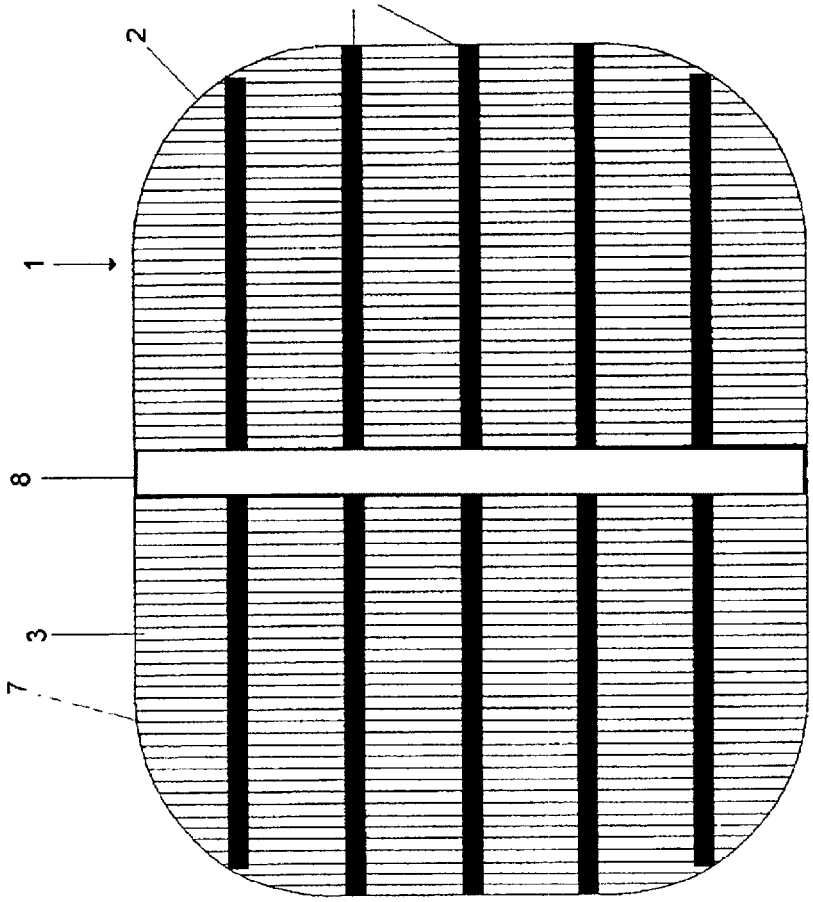
FIG. 8a is a schematic depiction of a lengthwise-cross-sectional view of a fifth embodiment of a hydrogen storage bed system of the instant invention, including heat pipes instead of heat sinks in the heat distribution means.

FIG. 8a is a schematic depiction of a lengthwise-cross-sectional view of a fifth embodiment of a hydrogen storage bed system 1 of the instant invention. The system 1, includes a cylindrical pressure container 2 within which is contained a hydrogen storage alloy 3. The integrated thermal management system includes at least one combined heating/cooling means 8, which is a hollow disk disposed within the cylindrical pressure container 2, wherein the central axis of the hollow disk is coincidental with the central axis of the cylindrical pressure container 2. The interior of the hollow disk is coated with a catalytic material to form a catalytic combustor. Thus, the interior of the hollow disk acts as a heater when fuel and an oxidizer are passed therethrough, and as a cooler when a coolant gas (such as air or hydrogen) is passed therethough. The heating/cooling means 8 are in intimate thermal contact with a heat distribution system which includes heat pipes 9 and distributed heat distribution fins 7. One end of the heat pipes 9 is in thermal contact with one of the circular surfaces of the combined heating/cooling means hollow disk 8. The heat pipes extend along the length of the cylindrical pressure container 2 from the combined heating/cooling means 8, in the both directions, to the ends of the cylindrical pressure container 2. The heat distribution fins 7 are cylindrical disks evenly disposed within the cylindrical pressure container 2 between the combined heating/cooling means 8 and the ends of the cylindrical pressure container 2. The central axis of the heat distribution fins 7 is coincidental with the central axis of the cylindrical pressure container 2. The heat distribution fins 7 are in thermal contact with the heat pipes 9, and extend axially to the interior wall of the cylindrical pressure container 2.

FIG. 8b is a schematic depiction of a transverse-cross-sectional view of the fifth embodiment of a hydrogen storage bed system 1 of FIG. 8a. The figure shows the positioning within the system 1, of the cylindrical pressure container 2 and the hydrogen storage alloy 3. Specifically shown is the manner in which the heat pipes 9 are distributed within the system 1 and how the heat pipes 9 extend along the length of the cylindrical pressure container 2.

A heat pipe is a device utilizing an evaporation and condensation cycle for transferring heat from a hot or heat input region to a cold or heat output region thereof with minimum temperature drop. One type of heat pipe comprises a closed container within which is included a layer of wicking material saturated with a vaporizable liquid and extending from the heat input region to the heat output region thereof. The addition of heat at the heat input region of the container evaporates the liquid being supplied thereto. The vapor moves to the heat output region of the container where it is condensed. The condensed liquid is returned to the heat input region by capillary action in the wicking material. It should be noted that while the heat pipes described in the specific embodiments of the instant invention are pipe shaped, modern heat pipe technology allows for nearly any hollow shape to be used in forming a heat pipe, and thus other shapes are possible and may be useful.

Figure 9B:
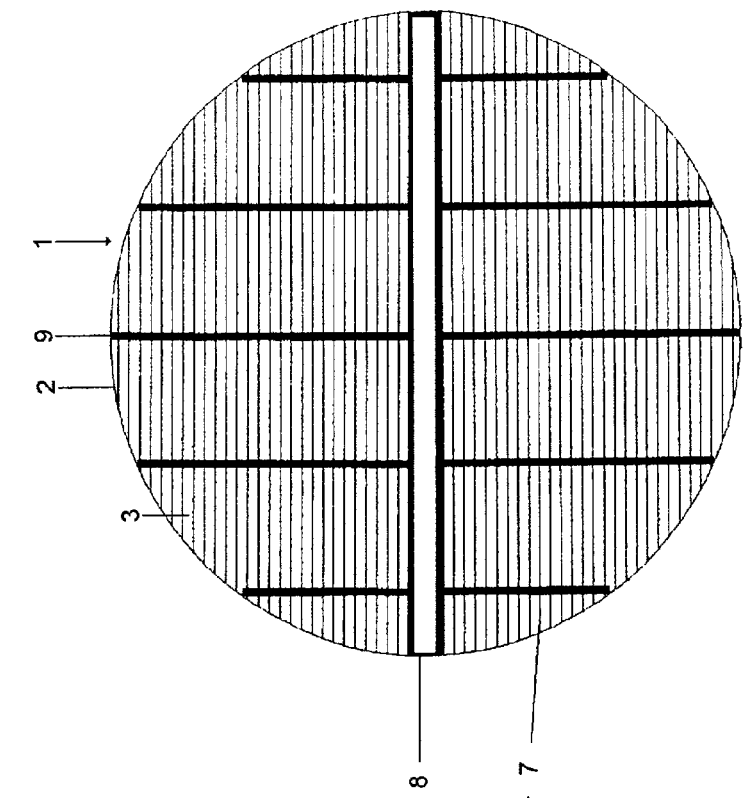
Figure 9A:
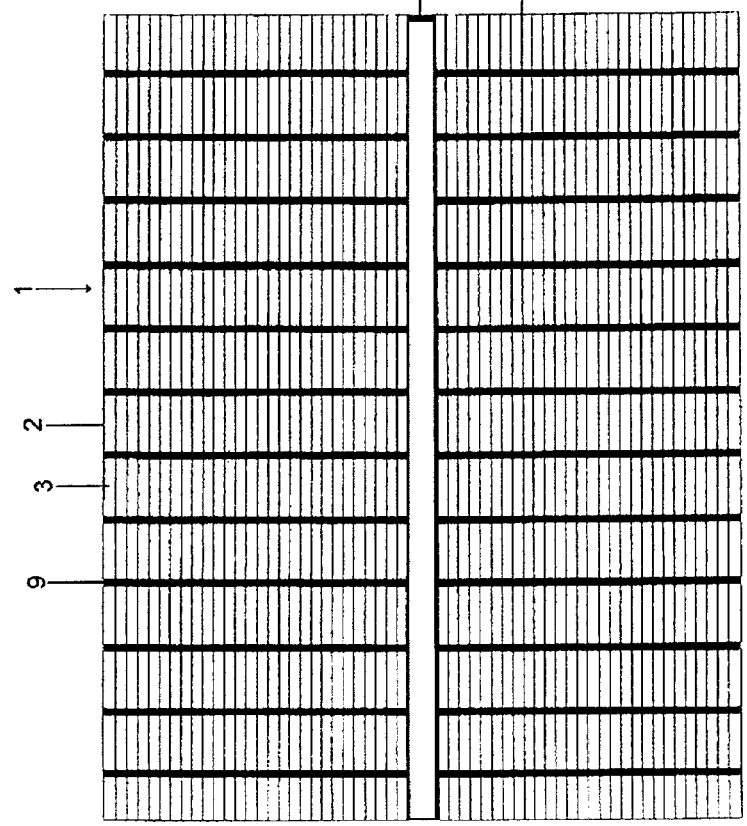
FIG. 9a is a schematic depiction of a lengthwise-cross-sectional view of a sixth embodiment of a hydrogen storage bed system of the instant invention, including a different configuration of heat pipes.

FIG. 9a is a schematic depiction of a lengthwise-cross-sectional view of a sixth embodiment of a hydrogen storage bed system 1 of the instant invention. The system 1, includes a cylindrical pressure container 2 within which is contained a hydrogen storage alloy 3. The integrated thermal management system includes at least one combined heating/cooling means 8, which is a hollow rectangular plate disposed within the cylindrical pressure container 2 such that the length of the hollow traverses the length of the cylinder and the width of the hollow rectangular plate traverses a diameter of the cylinder. The heating/cooling means 8 are in intimate thermal contact with a heat distribution system which includes heat pipes 9 and distributed heat distribution fins 7. One end of the heat pipes 9 is in thermal contact with one of the large rectangular surfaces of the combined heating/cooling means hollow plate 8. The heat pipes extend from the thermal contact with the heating/cooling means 8 outward in a generally perpendicular direction from the large rectangular surfaces of the combined heating/cooling means hollow plate 8 to the wall of the cylindrical pressure container 2. The heat distribution fins 7 are rectangular plates or foil which are disposed within the cylindrical pressure container 2 such that the length thereof traverses the length of the cylinder. The rectangular plates or foil are disposed within the cylindrical pressure container 2 generally parallel to the heating/cooling means hollow plate 8, and the length of the rectangular plates or foil traverses the length of the cylinder and the width of the slab traverses from one point on the interior wall of the cylinder to another point on the interior wall of the cylinder. The heat distribution fins 7 are in thermal contact with the heat pipes 9.

FIG. 9b is a schematic depiction of a transverse-cross-sectional view of the sixth embodiment of a hydrogen storage bed system 1 of FIG. 9a. The figure shows the positioning within the system 1, of the cylindrical pressure container 2 and the hydrogen storage alloy 3. Specifically shown is the manner in which the heat pipes 9 are distributed within the system 1 and how the heat pipes 9 extend along the a diameter width of the cylindrical pressure container 2 and the positioning of the heat distribution fins 7.

It should be noted that a plurality of storage bed systems of the instant invention can be bundled together in a larger container. This container may be insulated and may provide for external heating and cooling of the storage bed systems. The container may also be a pressure containment vessel. Additionally, thermocouples may be placed within the storage bed system to monitor the temperature throughout different parts of the system, and thus by measuring temperature spiking at different locations, the volume of fuel can be determined.

Finally, the hydrogen storage bed system 1 of the instant invention can include a hydrogen gas distribution system to enhance the speed of hydriding/dehydriding of the storage alloy. The distribution system typically includes a distribution manifold and one or more hydrogen permeable gas distribution tubes distributed throughout the hydrogen storage alloy.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A hydrogen storage bed system including:
   a pressure container;
   a hydrogen storage alloy disposed within said pressure container; and
   an integrated thermal management system integrally disposed within said pressure container including:
   heat generation means;
   cooling means; and
   heat distribution means.

2. The hydrogen storage bed system of claim 1, wherein said heat generation means is selected from the group consisting of electrical heating elements and catalytic combustors.

3. The hydrogen storage bed system of claim 2, wherein said beat generation means is one or more catalytic combustors.

4. The hydrogen storage bed system of claim 3, wherein said catalytic combustors are designed to combust at least one fuel selected from the group consisting of hydrogen, gasoline, fuel oil, propane, diesel fuel, and natural gas.

5. The hydrogen storage bed system of claim 4, wherein said catalytic combustors are designed to combust propane.

6. The hydrogen storage bed system of claim 1, wherein said cooling means comprises a tube-type heat exchanger.

7. The hydrogen storage bed system of claim 6, wherein said tube-type heat exchanger is designed to utilize at least one coolant selected from the group consisting of air, hydrogen, water and organic coolants.

8. The hydrogen storage bed system of claim 7, wherein said tube-type seat exchanger is designed to utilize air as the coolant.

9. The hydrogen storage bed system of claim 7, wherein said tube-type heat exchanger is designed to utilize hydrogen as the coolant.

10. The hydrogen storage bed system of claim 7, wherein said tube-type heat exchanger is designed to utilize water as the coolant.

11. The hydrogen storage bed system of claim 1, wherein said heat generation means and said cooling means are combined into a single unit designed to catalytically combust propane or hydrogen and utilize air or hydrogen as the coolant.

12. The hydrogen storage bed system of claim 1, wherein said heat distribution means includes heat sinks thermally coupled to both said heat generation means and said cooling means.

13. The hydrogen storage bed system of claim 12, wherein said heat distribution means further includes heat distribution fins thermally coupled to said heat sinks and dispersed within said hydrogen storage alloy.

14. The hydrogen storage bed system of claim 13, wherein said heat distribution fins and said heat sinks are formed from a material selected from the group consisting of thermally conductive graphite, stainless steel, magnesium and magnesium alloys.

15. The hydrogen storage bed system of claim 1, wherein said heat distribution means includes heat pipes thermally coupled to both said heat generation means and said cooling means.

16. The hydrogen storage bed system of claim 15, wherein said heat distribution means further includes heat distribution fins thermally coupled to said heat pipes and dispersed within said hydrogen storage alloy.

17. The hydrogen storage bed system of claim 16, wherein said heat distribution fins are formed from a material selected from the group consisting of thermally conductive graphite, stainless steel, magnesium and magnesium alloys.

18. The hydrogen storage bed system of claim 1, wherein said hydrogen storage alloy is selected from the group consisting of Ti—Zr based alloys and Mg based alloys.

19. The hydrogen storage bed system of claim 18, wherein said hydrogen storage alloy is a Mg based alloy.

20. The hydrogen storage bed system of claim 19, wherein said alloy includes at least 90 weight % magnesium.

21. The hydrogen storage bed system of claim 20, wherein said alloy further includes 0.5–2.5 weight % nickel.

22. The hydrogen storage bed system of claim 21, wherein said alloy further includes 1.0–4.0 weight % Misch metal.

23. The hydrogen storage bed system of claim 22, wherein said alloy further includes 1.0–4.0 weight % Misch metal.

24. The hydrogen storage bed system of claim 23, wherein said Misch metal comprises predominantly Ce, La and Pr.

25. The hydrogen storage bed system of claim 23, wherein said alloy further includes one or more from the group consisting of 3–7 weight % Al, 0.1–1.5 weight % Y and 0.3–1.5 weight % silicon.

26. The hydrogen storage bed system of claim 19, wherein said hydrogen storage alloy is in the form of powder, pellets or a mixture thereof.

27. The hydrogen storage bed system of claim 26, wherein said hydrogen storage alloy is in the form of a mixture of powder and pellets.

28. The hydrogen storage bed system of claim 1, wherein said pressure container is formed from one or more materials selected from the group consisting of stainless steel or fiber reinforced polymers.

29. The hydrogen storage bed system of claim 1, wherein said pressure container is a multilayer structure.

30. The hydrogen storage bed system of claim 29, wherein said pressure container is a three layered structure.

31. The hydrogen storage bed system of claim 30, wherein said three Layered structure comprises:

an inner layer formed form a lightweight material which is non-reactive with hydrogen and said storage alloy, and can withstand the operating temperature of the system;

a middle layer formed from a lightweight insulating; and an outer layer formed from a fiber reinforced polymer composite which contains the operating pressure of the bed system.

32. The hydrogen storage bed system of claim 1, wherein said system further comprises thermocouples disposed throughout the interior of said hydrogen storage alloy to determine the state of charge of said system by observing temperature spikes in discharged areas of said alloy.

33. The hydrogen storage bed system of claim 1, wherein said system further comprises a hydrogen gas distribution system to enhance the speed of hydriding/dehydriding of said storage alloy.

34. The hydrogen storage bed system of claim 33, wherein said hydrogen gas distribution system includes a distribution manifold and one or more hydrogen permeable gas distribution tubes distributed throughout said hydrogen storage alloy.

35. The hydrogen storage bed system of claim 1, wherein said integrated thermal management system further comprising:

heat conducting projections extending and distributed within said pressure container in heat transfer contact with said hydrogen storage alloy; and a heating/cooling sink positioned within said pressure container and connected in heat transfer relationship to said heat conducting projections and to said heat generation means and said cooling means;

whereby heat is transferred to said hydrogen storage alloy from said heat generation means and from said hydrogen storage alloy to said cooling means through said heat conducting projections and said heating/cooling sink.

36. The hydrogen storage bed system of claim 19, wherein said Mg based alloy has a composition of 95.6 wt. % Mg, 1.6 wt. % Ni, 0.8 wt. % Si and 2.0 wt % Mn.

* * * * *